United States Patent
Liu et al.

(10) Patent No.: US 12,063,568 B2
(45) Date of Patent: Aug. 13, 2024

(54) ELECTRONIC APPARATUS, WIRELESS COMMUNICATION METHOD AND COMPUTER-READABLE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 420 days.

(21) Appl. No.: 17/598,304

(22) PCT Filed: Apr. 23, 2020

(86) PCT No.: PCT/CN2020/086336
§ 371 (c)(1),
(2) Date: Sep. 27, 2021

(87) PCT Pub. No.: WO2020/221092
PCT Pub. Date: Nov. 5, 2020

(65) Prior Publication Data
US 2022/0182913 A1    Jun. 9, 2022

(30) Foreign Application Priority Data

Apr. 30, 2019  (CN) .......................... 201910361254.9
Aug. 16, 2019  (CN) .......................... 201910759088.8

(51) Int. Cl.
*H04W 36/32*         (2009.01)
*H04B 7/185*          (2006.01)
(Continued)

(52) U.S. Cl.
CPC ........ *H04W 36/32* (2013.01); *H04B 7/18541* (2013.01); *H04L 1/1812* (2013.01);
(Continued)

(58) Field of Classification Search
CPC . H04W 36/32; H04W 16/28; H04W 36/0072; H04W 84/06; H04W 36/249;
(Continued)

(56) References Cited

U.S. PATENT DOCUMENTS 6,272,315 B1 *  8/2001  Chang ................ H04B 7/18563
                                                         455/433
8,712,321 B1    4/2014  Dankberg
(Continued)

FOREIGN PATENT DOCUMENTS

CN    108112281 A    6/2018
CN    109075853 A    12/2018
(Continued)

OTHER PUBLICATIONS

International Search Report and Written Opinion mailed on Jul. 22, 2020, received for PCT Application PCT/CN2020/086336, Filed on Apr. 23, 2020, 9 pages including English Translation.
(Continued)

*Primary Examiner* — Vinncelas Louis
(74) *Attorney, Agent, or Firm* — XSENSUS LLP

(57) ABSTRACT

Disclosed are an electronic apparatus for wireless communication, a wireless communication method and a computer-readable medium. The electronic apparatus for wireless communication comprises a processing circuit. The processing circuit is configured to perform control so as to send, by means of beam-based non-terrestrial network communication, information about beam switching of a base station to a user equipment, to determine a temporal or spatial position of beam switching, and to perform control so as to perform beam switching when the determined temporal or spatial position is reached.

15 Claims, 9 Drawing Sheets

(51) Int. Cl.
*H04L 1/1812* (2023.01)
*H04L 5/00* (2006.01)
*H04W 16/28* (2009.01)
*H04W 36/00* (2009.01)
*H04W 84/06* (2009.01)

(52) U.S. Cl.
CPC ........... *H04L 5/0053* (2013.01); *H04W 16/28* (2013.01); *H04W 36/0072* (2013.01); *H04W 84/06* (2013.01)

(58) Field of Classification Search
CPC ............. H04W 74/006; H04B 7/18541; H04B 7/1851; H04B 7/18519; H04B 7/18563; H04L 1/1812; H04L 5/0053
See application file for complete search history.

(56) References Cited

U.S. PATENT DOCUMENTS

| | | |
|---|---|---|
| 2017/0099120 A1 | 4/2017 | Damnjanovic |
| 2019/0081697 A1 | 3/2019 | Wyler |
| 2020/0052782 A1* | 2/2020 | Wang .................. H04W 74/006 |
| 2020/0178135 A1* | 6/2020 | Yun .................... H04B 7/18541 |
| 2022/0086715 A1* | 3/2022 | Hong .................. H04W 36/249 |

FOREIGN PATENT DOCUMENTS

| | | |
|---|---|---|
| CN | 109586771 A | 4/2019 |
| EP | 0951190 A2 | 10/1999 |
| JP | 2003318794 A | 11/2003 |
| JP | 2004128631 A | 4/2004 |
| JP | 2004304287 A | 10/2004 |
| JP | 2015180026 A | 10/2015 |
| JP | 2018520536 A | 7/2018 |
| WO | WO-2018044693 A1 | 3/2018 |

OTHER PUBLICATIONS

Catt , "Physical layer procedure enhancement for NTN" [online] , 3GPP TSG RAN1 WG #96b R1-1904549 , France.

Intel Corporation , "On TCI State Switch Delay" [online] , 3GPP TSG RAN WG4 #90 R4-1900111 , France.

\* cited by examiner

ELECTRONIC APPARATUS, WIRELESS COMMUNICATION METHOD AND COMPUTER-READABLE MEDIUM

CROSS-REFERENCE TO RELATED APPLICATIONS

This application is based on PCT filing PCT/CN2020/086336, filed Apr. 23, 2020, which claims the priority to Chinese Patent Application No. 201910361254.9, entitled "ELECTRONIC APPARATUS, WIRELESS COMMUNICATION METHOD AND COMPUTER READABLE MEDIUM" filed with the China National Intellectual Property Administration on Apr. 30, 2019, and the priority to Chinese Patent Application No. 201910759088.8, entitled "ELECTRONIC APPARATUS, WIRELESS COMMUNICATION METHOD AND COMPUTER READABLE MEDIUM" filed with the China National Intellectual Property Administration on Aug. 16, 2019, each of which are incorporated herein by reference in their entireties.

FIELD

The present disclosure generally relates to the field of wireless communications, and in particular to an electronic device, a wireless communication method for non-terrestrial network (NTN) communications and a computer readable medium.

BACKGROUND

3GPP (Third Generation Partnership Project) has proposed satellite communications as an option in scenarios such as aircraft communications, maritime ships, and backhauls in remote areas, and suggests making full use of the capabilities of satellites.

Due to relative movement between a satellite and the ground, a service beam of the satellite base station needs to be continuously adjusted according to the movement of the satellite to ensure user coverage. That is, the movement of the satellite would lead to beam handover at the base station side and the user side. As shown in the examples of FIGS. 5 and 6, at a time instant T1, services are provided to the user through a beam SSB #1, and at a time instant T2, the beam for providing services to the user is switched to a beam SSB #2 due to the movement of the satellite. SSB #1 and SSB #2 belong to the same cell, that is, they are generated by the same satellite (the low earth orbit satellite LEO #1 in FIG. 5). In addition, even for a satellite that is stationary relative to the ground, the beam may need to be adjusted due to the movement of the user equipment. For example, when a geosynchronous orbit (GEO) satellite provides services to a user on an airplane, the GEO needs to switch beams to ensure coverage since the airplane moves.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an embodiment, an electronic device for wireless communications is provided. The electronic device includes processing circuitry configured to: perform control to send information on beam handover of a base station to user equipment through beam-based non-terrestrial network communication; determine a temporal or a spatial position for the beam handover; and perform control to perform the beam handover upon arrival of the determined temporal or spatial position.

According to another embodiment, a wireless communication method includes: sending information on beam handover of a base station to user equipment through beam-based non-terrestrial network communication; determining a temporal or a spatial position for the beam handover; and performing the beam handover upon arrival of the determined temporal or spatial position.

According to yet another embodiment, an electronic device for wireless communications is provided. The electronic device including processing circuitry configured to: perform control to receive, from a base station, information on beam handover of the base station through beam-based non-terrestrial network communication; determine a temporal position for beam handover of user equipment; and perform control to perform the beam handover of the user equipment at the determined temporal position.

According to still another embodiment, a wireless communication method includes: receiving, from a base station, information on beam handover of the base station through beam-based non-terrestrial network communication; determining a temporal position for beam handover of user equipment; and performing the beam handover of the user equipment at the determined temporal position.

An embodiment of the present disclosure further includes a computer readable medium including executable instructions that, when executed by an information processing apparatus, cause the information processing apparatus to implement the method according to the above embodiments.

With the embodiments of the present disclosure, correct beam handover can be implemented by the base station and the user equipment, thereby avoiding a situation of link failure due to misalignment between a beam of the base station and a beam of the user equipment caused by inconsistency in beam handover time of the base station and that of the user equipment.

These and other advantages of the present disclosure will be more apparent by illustrating in detail a preferred embodiment of the present disclosure in conjunction with accompanying drawings below.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
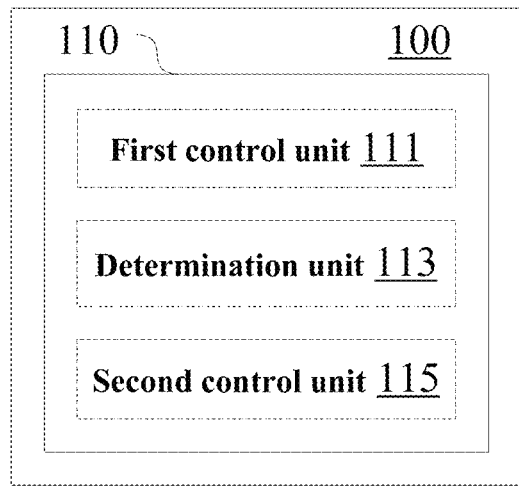
FIG. 1 is a block diagram showing a configuration example of an electronic device for wireless communications according to an embodiment of the present disclosure.

Embodiments of the present disclosure are described below with reference to the drawings. Elements and features described in one of the drawings or one of the embodiments of the present disclosure may be combined with elements and features described in one or more other drawings or embodiments. It should be noted that representations and descriptions of components and processing which are irrelevant to the present disclosure or known by those skilled in the art are omitted in the drawings and the specification for clarity.

As shown in FIG. 1, an electronic device 100 for wireless communications according to an embodiment includes processing circuitry 110. The processing circuitry 110 may be implemented as, for example, a specific chip, a chipset, a central processing unit (CPU) or the like.

The processing circuitry 110 includes a first control unit 111, a determination unit 113, and a second control unit 115. It should be noted that, although the first control unit 111, the determination unit 113, and the second control unit 115 are shown as functional blocks in the drawings, it should be understood that functions of these units may also be implemented by the processing circuitry as a whole, and are unnecessarily implemented by discrete actual components in the processing circuitry. In addition, although the processing circuitry is shown as one block in the drawings, the electronic device may include multiple processing circuitries. The functions of respective units may be distributed to the multiple processing circuitries, so that the multiple processing circuitries cooperate to perform these functions.

As described above, due to relative movement between a satellite and the ground or movement of the user equipment (UE), a service beam of the satellite base station needs to be adjusted according to the movement of the satellite or the UE to ensure coverage for the UE. That is, the movement of the satellite or the UE may cause beam handover on the base station side and the UE side. The electronic device according to the embodiment may be implemented on the base station (satellite) side.

The first control unit 111 is configured to perform control to send information on beam handover of a base station to UE through beam-based NTN communication.

In the existing terrestrial network, channels or signals involved in beam handover may include, for example, a physical downlink control channel (PDCCH), a physical downlink shared channel (PDSCH), a physical uplink control channel (PUCCH), a physical uplink shared channel (PUSCH), a channel state information interference measurement (CSI-IM) or channel state information reference signal (CSI-RS), and a sounding reference signal (SRS). Here, the PDCCH and the PDSCH are taken as examples for brief description. For the PDCCH, multiple transmission configuration indication (TCI) states are configured for a Coreset through radio resource control (RRC), and one of the TCI states is activated/indicated by using a media access control control element (MAC CE). The UE performs beam handover 3 ms after feeding back a hybrid automatic repeat request acknowledgement (HARQ-ACK) containing beam handover information of the PDCCH. For the PDSCH, multiple TCI states are configured for the PDSCH through RRC, and some of the TCI states are activated by using the MAC CE. Activation of beams indicated by these TCI states is performed 3 ms after the UE feeds back an HARQ-ACK containing beam activation information of the PDSCH. Then, one of the TCI states is indicated through downlink control information (DCI).

As can be seen from the above description, the beam handover in the terrestrial network is determined based on the time when the UE feeds back the HARQ-ACK. However, due to the transmission time delay in the non-terrestrial network, the HARQ-ACK mechanism in the conventional terrestrial network and the beam handover timing determined based on the time when the UE feeds back the HARQ-ACK are not applicable to the non-terrestrial network. A beam handover solution for the non-terrestrial network is provided according to the embodiments of the present disclosure.

Similarly, the timing of a semi-persistent resource configuration in the terrestrial network is also determined based on the time of the HARQ-ACK. The semi-persistent resource configuration includes, for example, activation/deactivation of one or more of the following: a semi-persistent zero power channel state information reference signal (semi-persistent ZP-CSI-RS), a semi-persistent non-zero power channel state information reference signal (semi-persistent CSI-RS), a semi-persistent channel state information interference measurement (semi-persistent CSI-IM), a semi-persistent channel state information reporting (semi-persistent CSI reporting), and a semi-persistent sounding reference signal (semi-persistent SRS).

Taking the activation of the semi-persistent CSI-RS as an example, multiple channel state information reference signal resource sets (CSI-RS resource sets) are configured for user equipment through radio resource control (RRC), and one of the CSI-RS resource sets is activated by using a media access control control element (MAC CE). If the UE feeds back an ACK for a PDSCH containing activation information in a slot n, the UE considers that the activation of the CSI-RS semi-persistent resource is to be applied after slot n+3 ms, where 3 ms may also be replaced by the number of slots, for example, $3N_{slot}^{subframe,\mu}$ slots, N representing the number of slots contained in each subframe under a subcarrier space (SCS) indicated by $\mu$. $\mu$ represents the exponential amplification of the SCS, that is, SCS=15 KHz*$2^\mu$. However, due to the transmission delay in the non-terrestrial network, the HARQ-ACK mechanism and the semi-persistent resource activation (or deactivation) timing determined based on the time when the UE feeds back the HARQ-ACK (for example, the above slot n) in the traditional terrestrial network is not applicable to the non-terrestrial network. The embodiments of the present disclosure are also applicable to activation/deactivation of a semi-persistent resource. The beam handover and the activation/deactivation of the semi-persistent resource described above are only examples, and the embodiments of the present disclosure are applicable to other scenarios, such as beam deactivation (beam indication through MAC CE) and the like. More generally, the embodiments of the present disclosure are applicable to any occasions where the HARQ feedback mechanism is not applicable and/or communication configuration operations performed based on the HARQ feedback mechanism is not applicable due to time delay, and are not limited to the specific examples given in this embodiment. For example, the first control unit 111 may be configured to perform control to send information on a communication configuration operation of a base station to user equipment through the beam-based non-terrestrial network communication, where the communication configuration operation includes but is not limited to beam handover, beam activation/deactivation, semi-persistent resource activation/deactivation, and the like.

It is to be noted that the temporal position herein includes not only a temporal value expressed in time units such as hours, minutes, seconds, milliseconds, or the like, but also a temporal value represented by a system temporal position such as a slot number or a system frame number when the base station and the user equipment are in a synchronization state. In addition, the various durations in the present disclosure not only include a duration expressed in various time units such as hours, minutes, seconds, or milliseconds, but also include a duration represented by the number of slots. The above explanation is applicable to the temporal position, absolute temporal position, temporal value, and absolute temporal value to be mentioned in the following detailed description, and will not be repeated hereinafter.

For ease of understanding, in the following description, beam handover and semi-persistent resource activation/deactivation are used as specific examples. It should be understood that this is not restrictive.

According to an embodiment, the first control unit 111 may be configured to indicate a beam to which the base station is to be switched or a beam to which the user equipment is to be switched by using indication information on a spatial colocation relationship in the PDCCH or PDSCH. That is, the information on beam handover of the base station sent by the base station to the UE may include indication of the beam to which the base station is to be switched, or may include indication of the beam to which the UE is to be switched (since the beam to which the UE is to be switched corresponds to the beam to which the base station is to be switched, the beam to which the UE is to be switched may be considered as the information on the beam handover of the base station).

More specifically, the base station may indicate the beam to which the base station is to be switched through a TCI status in the PDCCH or PDSCH. In this case, the base station may notify the UE of a downlink beam, and the UE performs uplink beam handover according to a measured uplink and downlink beam pairing result. Alternatively, the base station may indicate the beam to which the UE is to be switched through spatial relation information in the PDCCH or PDSCH.

With continued reference to FIG. 1, the determination unit 113 is configured to determine a temporal position or a spatial position for the beam handover of the base station. The second control unit 115 is configured to perform control to perform the beam handover of the base station upon arrival of the temporal position or the spatial position determined by the determination unit 113.

Based on different hybrid automatic repeat request (HARQ) assumptions in NTN, the above scheme may include multiple specific beam handover manners. HARQ assumptions may include a case that there is no HARQ mechanism or HARQ-ACK feedback mechanism (for example, only an NACK is fed back) in an NTN system, and a case that there is a HARQ-ACK mechanism in the NTN system. Next, embodiments for the case that there is no HARQ mechanism (or no HARQ-ACK feedback mechanism) and the case that there is the HARQ-ACK mechanism are respectively described.

According to an embodiment, the information sent to the UE by the first control unit 111 performing control may include the beam to which the base station is to be switched and the temporal or spatial position determined by the determination unit 113. In other words, the base station may instruct the UE when to perform beam handover by sending information of an activated beam and absolute temporal information or satellite geographic location information.

This solution is applicable to the case that there is no HARQ mechanism or HARQ-ACK feedback mechanism in the NTN system. In this case, the UE does not feedback whether the PDSCH carrying the beam handover information (for example, MAC CE information used in the terrestrial network: TCI activation) is correctly received. In this case, for example, system reliability may be improved by using a method such as transmission time interval (TTI) bundling.

In order that the UE performs beam handover at correct time, the base station may instruct the UE when to perform beam handover by sending the information of the activated beam and the absolute temporal information.

Figure 7:
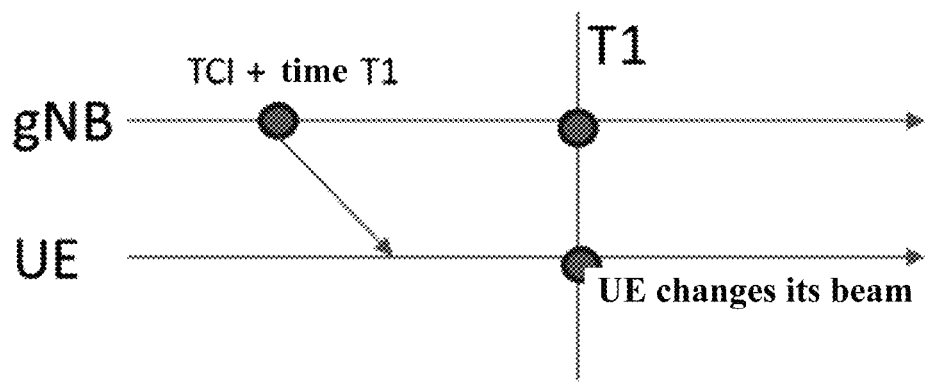
FIGS. 7 to 13 are schematic diagrams showing examples of timing configuration of beam handover on a base station side and a user equipment side.

In the example shown in FIG. 7, the base station, for example, includes the absolute temporal value, such as T1, at which the UE is to perform beam handover into the MAC CE, and the UE switches, according to the received TCI #1 and T1, a UE side beam to a beam corresponding to TCI #1 at the time instant T1. The absolute temporal value may be a temporal value including an hour, a minute, a second, and a millisecond, or a temporal value that includes only a part of the above-mentioned time units, for example, a temporal value that includes only a second and a millisecond. Alternatively, the absolute temporal value may be a serial number of a slot. As shown in FIG. 7, the base station and the UE perform beam handover at the absolute time T1.

Figure 8:
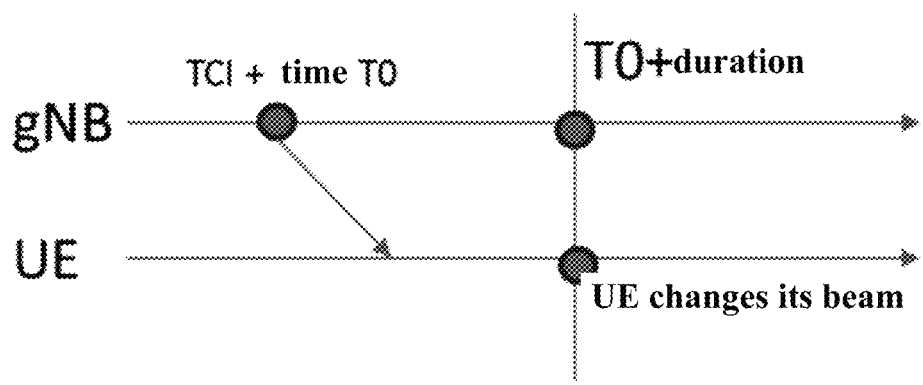

FIG. 8 shows another example of beam handover based on the absolute temporal information. In this example, the base station includes the absolute temporal value T0 when the beam handover information is sent into the MAC CE. The time T0 may be implicit, and may be represented by, for example, a slot number of a PDSCH carrying the MAC CE. The UE performs beam handover after the elapse of a predetermined duration, such as Xms or x slots, since T0. As shown in FIG. 8, the base station and the UE perform beam handover after the elapse of a predetermined duration since the absolute time T0. In addition, the value of Xms or x slots is not limited to a predefined value, but may alternatively be configured explicitly such as one of the following: directly indicated in a DCI, an RRC or an MAC CE; indicated through a combination of multiple signaling; indicated by accumulating an existing reference value such as a common TA with an indication value in the DCI, the RRC or the MAC CE. In addition, the value of Xms or x slots may alternatively be calculated based on a distance between the satellite and the user.

In addition, the base station may instruct the UE when to perform beam handover by sending the information of the activated beam and satellite geographic location information. For example, the base station may include a satellite geographic location value, such as a location 1, where the UE is to perform beam handover into the MAC CE. The UE switches a UE side beam to a beam corresponding to TCI #1 according to the received TCI #1 and the location 1 when the satellite arrives at the location 1.

The user may determine a location of the satellite according to a satellite ephemeris/orbit map broadcasted by the base station. Correspondingly, according to an embodiment, in a case that the determination unit 113 determines the spatial position for the beam handover and the first control unit 111 notifies the UE of the spatial position, the first control unit 111 may be further configured to perform control to broadcast information on the satellite ephemeris map or satellite orbit map, so that the UE may determine the temporal position for the beam handover from the spatial position for the beam handover of the base station, according to the satellite ephemeris map or the satellite orbit map, so as to synchronously perform the beam handover on the UE side.

In the above two examples, the base station sends the absolute temporal (or geographic location) information to the UE to achieve simultaneous beam handover of the base station and the UE. However, the present disclosure is not limited thereto. According to another embodiment, the determination unit 113 may be configured to determine the temporal position for the beam handover, the temporal position is determined as a first temporal position after the elapse of a first duration since the base station sending the information to the UE. The information sent by the first control unit 111 to the UE may include a beam to which the base station is to be switched and a second duration, for the UE to perform beam handover of the UE at a second temporal position after the elapse of the second duration since receipt of the information.

The second duration may be explicitly configured such as one of the following: directly indicated in the DCI, the RRC or the MAC CE; indicated by a combination of multiple signaling; indicated by accumulating an existing reference value such as a common TA with an indication value in the DCI, the RRC or the MAC CE.

In addition, the second duration may be a predetermined value that is commonly known by both the base station and the UE, such as 16 slots, 10 milliseconds, and the like, or the second duration may be calculated based on a certain algorithm, such as calculated based on the distance between the satellite and the user.

In addition, the second control unit 115 may be further configured to perform control to simultaneously use both a handover source beam and a handover target beam to perform communication with the user equipment, in at least a part of a period of time from the sending of the information to the beam handover of the base station. In addition, the above first duration and second duration may be appropriately set in consideration of the distance between the base station and the UE, such that the second temporal position is later than the first temporal position.

In the above exemplary embodiment, the base station sends the information of the activated beam to the UE and agrees that the UE performs beam handover after the elapse of Xms or x slots since receipt of the beam activation information, and restricts the behavior of the base station. That is, the new beam and the old beam are simultaneously used to send information within a guard time interval, thereby further reducing the possibility of link failure.

Figure 9:
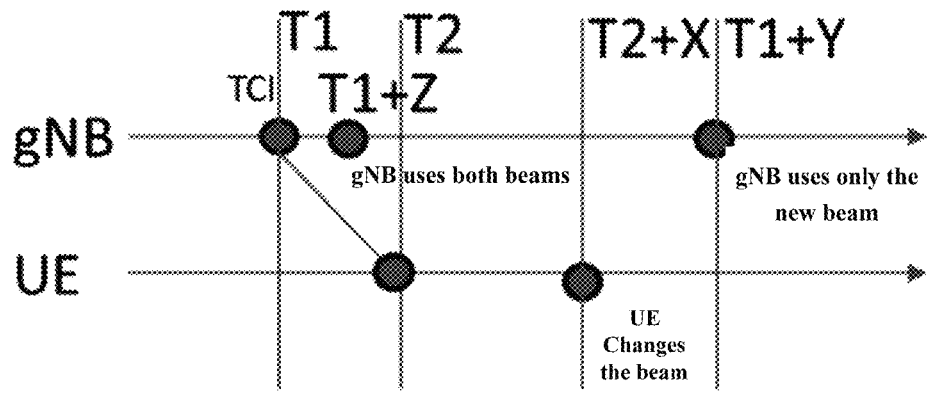

In the example shown in FIG. 9, the base station sends a PDSCH containing information of an activated beam at a time instant T1, and the base station simultaneously uses an original service beam and the new beam to be switched to for providing services to a user from a time instant T1+Z, where the two beams are used to send the same content. The user receives the PDSCH containing the information of the activated beam at T2, and performs beam handover at T2+X. The base station uses only the new beam for providing services to the user after a time instant T1+Y. For example, if the time instant is represented by slots, FIG. 9 shows: the base station sends the PDSCH containing the information of the activated beam in slot n (equivalent to the time instant T1), the user receives the PDSCH containing the information of the activated beam in slot n, and applies activation information of the beam, that is, perform beam handover in slot n+m (equivalent to the time instant T2+X), and the base station uses only the new beam to provide services to the user from slot n+k (equivalent to the time instant T1+Y). Z in the above example may be equal to 0, that is, both the handover source beam and the handover target beam may be used to communicate with the UE in the entire period of time from the sending of the information to the beam handover of the base station.

In addition, X in the above example may be set according to the time when the user demodulates the control information and the time for performing the beam handover. Preferably, the above-mentioned time is set such that T1+Y>T2+X.

With the above exemplary embodiments, even in the case that there is no HARQ for the PDSCH containing the beam handover information, the base station and UE can implement correct beam handover, avoiding misalignment between the beam of the base station and the beam of the user equipment caused by inconsistency in beam handover time of the base station and that of the user equipment.

It is to be noted that the although above describes the exemplary embodiment in the case that there is no HARQ mechanism or HARQ-ACK feedback mechanism in the NTN system, in a case that there is the HARQ-ACK mechanism, the manner of determining the timing of the beam handover by indicating absolute temporal or spatial information is also applicable. In other words, the manner of determining the timing of beam handover by indicating the absolute temporal or spatial information and the HARQ-ACK mechanism do not contradict each other.

Next, an embodiment in the case that there is the HARQ-ACK mechanism is described still with reference to FIG. 1.

According to an embodiment, the first control unit 111 is further configured to perform control to receive, from the UE, feedback for the information on the beam handover of the base station. The determination unit 113 is configured to determine the temporal position for the beam handover of the base station based on time when the feedback is sent.

Specifically, the above feedback of the UE may include an HARQ-ACK for the PDSCH.

For example, the UE may feedback whether the PDSCH carrying the beam handover information (for example, MAC CE information: TCI activation) is received correctly. If the UE reports the HARQ-ACK in a slot n, the UE may perform beam handover in a slot n+X.

Figure 10:
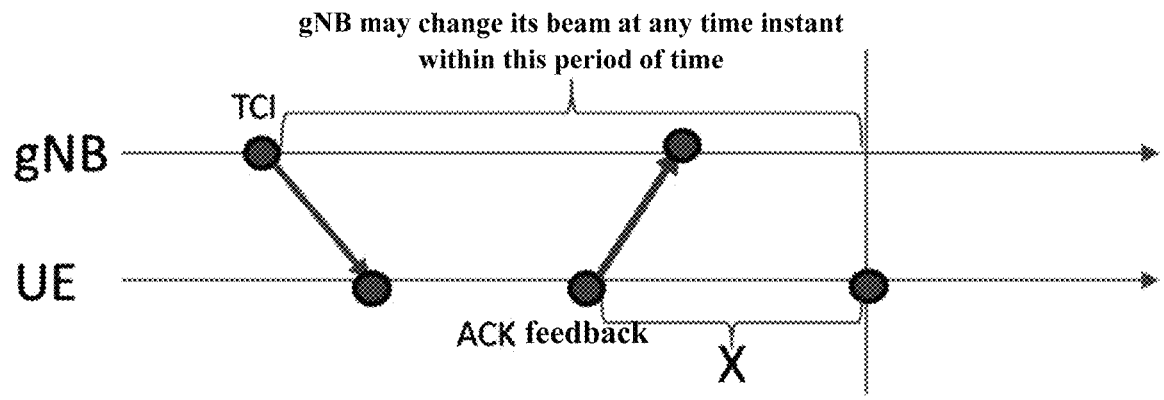

The following describes an example of a beam handover process in a case that there is the HARQ-ACK feedback with reference to FIG. 10. It is assumed here that the UE is configured with multiple TCI states and may activate one of the TCI states by using the MAC CE.

As shown in FIG. 10, the base station sends a PDSCH, which carries an MAC CE for activating a TCI state. Next, the UE receives and demodulates the PDSCH. If the PDSCH is successfully demodulated, the UE feeds back an ACK to the base station, and if the PDSCH is not successfully demodulated, the UE feeds back an NACK to the base station. The UE may change its beam after the elapse of Xms since the slot in which the HARQ-ACK information for the PDSCH is sent. If the UE feeds back NACK, the UE does not change its beam. The base station may change its beam in a period of time from the transmission of the PDSCH until the elapse of Xms since the slot in which the UE sends the HARQ-ACK information for the PDSCH. The base station may, for example, estimate the time for the UE to send the HARQ-ACK based on the time when the HARQ-ACK is received and the distance between the base station and the UE. In addition, in order to further reduce the possibility of link failure, the base station may adopt the manner of simultaneously using the new beam and the old beam to send information within the guard time interval as described above.

The value of X in the above example may be determined based on the distance between the UE and the satellite base station. For example, in a low earth orbit (LEO) scenario, X may be 10 ms, and in a geosynchronous orbit (GEO) scenario, X may be 300 ms.

The value of X is not limited to the above examples, but may be calculated by pre-estimating the distance between the satellite base station and the UE.

Correspondingly, according to an embodiment, the information sent to the UE may further include the distance between the base station and the UE.

For example, the base station may notify the UE of the distance information through RRC layer signaling, MAC layer signaling or DCI, or through a combination of multiple types of signaling. For example, assuming that a perigee of a satellite orbit is 1500 km away from the ground, the satellite base station notify the UE through RRC signaling that X1=8 ms. With the movement along the satellite orbit, the distance between the satellite base station and the UE changes, and the satellite base station notifies the UE through MAC layer signaling that X2=+1 ms, then the UE performs beam handover after the elapse of X=X1+X2=9 ms since feedback of an ACK.

In the above example, X, X1, and X2 may be temporal values or values representing time. For example, X2=1 may represent 0.1 ms, and the relationship between the representing value and time may be represented in the form of a table.

In addition, for different satellite orbit scenarios, for example, the time delay X may be determined by referring to the following Table 1.

TABLE 1

| | | \multicolumn{6}{c}{Transmission delays in different NTN scenarios} | | | | | |
|---|---|---|---|---|---|---|---|
| | | LEO 600 km | | LEO 1500 km | | GEO 35786 km | |
| Elevation Angle | Path | Distance D (km) | Delay (ms) | Distance D (km) | Delay (ms) | Distance D (km) | Delay (ms) |
| UE: 10° | Satellite-UE | 1932.24 | 6.440 | 3647.5 | 12.158 | 40586 | 135.286 |
| GW: 50° | Satellite-Gateway | 2329.01 | 7.763 | 4101.6 | 13.672 | 41126.6 | 137.088 |
| 90° | Satellite-UE | 600 | 2 | 1500 | 5 | 35786 | 119.286 |
| | | | Bent pipe satellite | | | | |
| One-way delay | Gateway-Satellite_UE | 4261.2 | 14.204 | 7749.2 | 25.83 | 81712.6 | 272.375 |
| | | | Regenerative satellite | | | | |
| One-way delay | Satellite -UE | 1932.24 | 6.44 | 3647.5 | 12.16 | 40586 | 135.286 |

In addition, the distance between the base station and the UE may alternatively be determined by the UE. For example, if the UE has a global navigation satellite system (GNSS) function, the UE may calculate the distance between the satellite and the UE. In addition, the UE may further report the calculated distance or a location of the UE to the base station.

With the above solution, in the case that there is the HARQ for the PDSCH containing beam handover information, an appropriate time interval may be adopted according to the large delay characteristics in the NTN network, so that the base station and the UE can perform beam handover correctly, thereby avoiding link failure due to misalignment between the beam of the base station and the beam of the user equipment caused by inconsistency in beam handover time of the base station and that of the user equipment.

Due to the ultra-long delay in the NTN, in order to reduce the processing complexity of the base station and the UE, a joint HARQ manner may be adopted, that is, results of multiple PDSCHs are simultaneously reported. In this case, beam handover on the base station side and on the UE side may be performed by using the manner of indicating the absolute temporal or spatial position as described above. Alternatively, the base station may configure a separate HARQ process for the PDSCH containing the beam handover information, instead of performing combined reporting with other PDSCHs.

Correspondingly, according to an embodiment, the first control unit 111 may be configured to perform a separate HARQ process for the PDSCH carrying information related to the beam handover of the base station.

With this solution, the waiting and processing delay caused by the joint HARQ that delays the beam handover time can be avoided in the case that there is the HARQ for the PDSCH containing the beam handover information.

In addition, due to the ultra-long delay in the NTN, in order to reduce the complexity of the base station and UE, the HARQ may be dynamically or semi-persistently enabled or disabled, that is, dynamic or semi-persistent signaling may be used to instruct the UE whether to perform HARQ feedback. In this case, beam handover on the base station side and the UE side may be performed by using the manner of indicating the absolute temporal or spatial position as described above. Alternatively, the base station may always configure an active HARQ for the PDSCH containing the beam handover information. Correspondingly, according to an embodiment, the first control unit 111 may be configured to set an HARQ process used by the PDSCH carrying the information related to the beam handover of the base station to be in an active state.

The solution for determining the timing of beam handover based on the NTN is described above. The timing of beam handover in the conventional solution is designed based on the HARQ. However, due to the ultra-long delay characteristics in the non-terrestrial network, the HARQ mechanism in the non-terrestrial network is different from the HARQ mechanism in the conventional solution. Based on different HARQ assumptions in the NTN, in the present disclosure, multiple timing schemes for beam handover in the non-terrestrial network are designed. In the following, a brief summary of the embodiments described above is given.

In the case that there is no HARQ process for the PDSCH carrying the beam handover information: the base station may send the information of the activated beam and the absolute temporal information to instruct the UE when to perform beam handover; the base station may send the information of the activated beam and restrict the behavior of the base station (to use the new beam and the old beam to simultaneously send information in the guard time interval), and agree that the UE performs beam handover after the elapse of Xms since receipt of the beam activation information; or the base station may send the information of the activated beam and the satellite geographic location information to instruct the UE when to perform beam handover.

In the case that there is the HARQ process for the PDSCH carrying the beam handover information: the timing of beam handover may be designed based on the HARQ-ACK, that is, it is agreed that the UE performs beam handover after the elapse of Xms since the sending of the HARQ-ACK for the PDSCH containing the beam activation information; in addition, a separate specific HARQ process may be used for the PDSCH carrying the beam handover information, or the HARQ process for the PDSCH carrying the beam handover information may always be in an enabled or active state.

In the above description of the electronic device according to the embodiments of the present disclosure, it is apparent that the following process and method are also disclosed. Next, a wireless communication method according to an embodiment of the present disclosure is described without repeating details described above.

Figure 2:
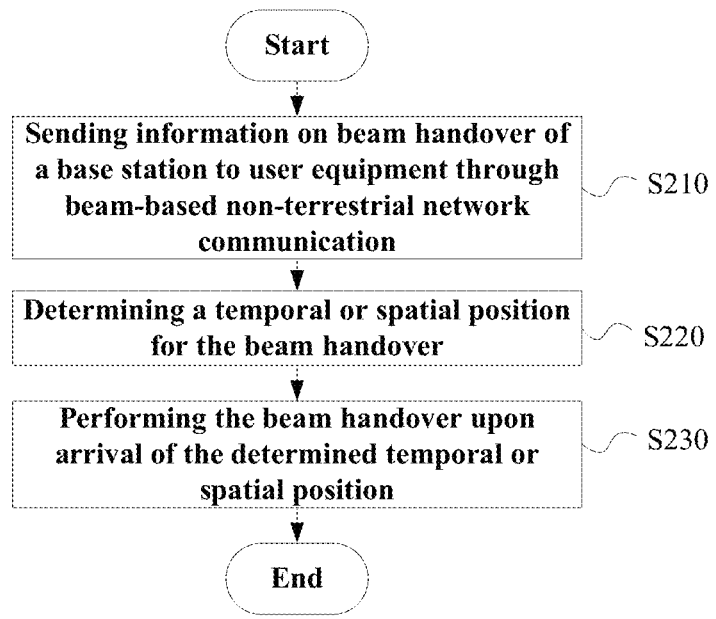
FIG. 2 is a flowchart showing a process example of a wireless communication method according to an embodiment of the present disclosure.

As shown in FIG. 2, a wireless communication method according to an embodiment includes a step S210 of sending information on beam handover of a base station to a UE through beam-based NTN communication. The method further includes a step S220 of determining a temporal or spatial position for the beam handover, and a step S230 of performing the beam handover upon arrival of the determined temporal or spatial position.

The device and the method described above correspond to the base station side. In the description of the embodiments on the base station side, the corresponding processing on the UE side is also involved. Next, embodiments of a device and a method on the UE side are described without repeating the details corresponding to the details described above.

Figure 3:
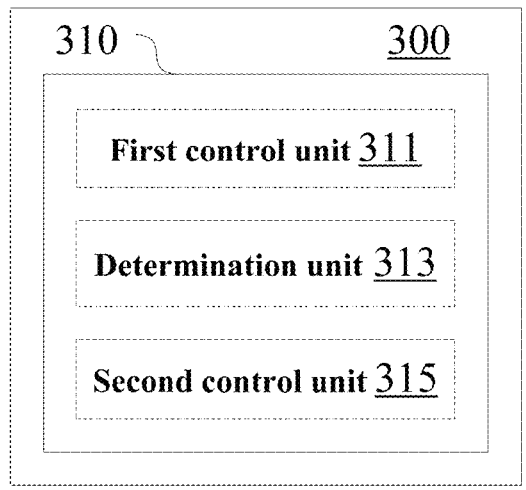
FIG. 3 is a block diagram showing a configuration example of an electronic device for wireless communications according to another embodiment of the present disclosure.

As shown in FIG. 3, an electronic device 300 for wireless communications according to an embodiment includes processing circuitry 310. The processing circuitry 310 includes a first control unit 311, a determination unit 313, and a second control unit 315.

The first control unit 311 is configured to perform control to receive, from a base station, information on beam handover of the base station through beam-based NTN communication.

For example, the information received from the base station may include a beam to which the base station is to be switched and a temporal or spatial position for the beam handover of the base station.

The determination unit 313 is configured to determine a temporal position for beam handover of UE.

The second control unit 315 is configured to perform control to perform the beam handover of the UE at the determined temporal position.

According to an embodiment, the information received from the base station may include a beam to which the base station is to be switched and a temporal position for the beam handover of the base station, and the determination unit 313 determines the temporal position for the beam handover of the base station as the temporal position for the beam handover of the UE.

According to another embodiment, the information received from the base station includes a beam to which the base station is to be switched and a duration, and the determination unit 313 determines a temporal position after the elapse of the duration since receipt of the information as the temporal position for the beam handover of the UE.

In addition, the information received from the base station may include a beam to which the base station is to be switched, a spatial position for the beam handover of the base station, and information on a satellite ephemeris map or a satellite orbit map, and the determination unit 313 determines the temporal position for the beam handover of the UE based on the information received from the base station.

According to an embodiment, the first control unit 311 may be further configured to perform control to send feedback for the information to the base station; and the determination unit 313 may determine the temporal position for the beam handover of the UE based on time when the feedback is sent and a distance between the UE and the base station.

The distance may be determined by the UE or may be indicated by the base station. Correspondingly, the determination unit 313 may determine the distance between the UE and the base station; or the first control unit 311 may perform control to receive information indicating the distance between the UE and the base station from the base station.

The feedback by the UE may include an HARQ-ACK for a PDSCH. The first control unit 311 may be configured to use a separate HARQ process for the PDSCH carrying the beam handover information, or to set an HARQ process used for the PDSCH carrying the beam handover information to be in an active state.

As described above, the embodiments of the present disclosure are also applicable to activation/deactivation of a semi-persistent resource. For example, the first control unit 111 of the electronic device 100 on the base station side may be configured to perform control to send information for activating/deactivating a semi-persistent resource to the user equipment through beam-based NTN communication. For example, the first control unit 111 may send the information for activating/deactivating the semi-persistent resource by using the MAC CE in the PDSCH.

For example, the first control unit 111 may be configured to activate/deactivate one of multiple semi-persistent CSI-RS resource sets by using MAC CE information in the PDSCH. The first control unit 111 may be configured to activate/deactivate one of multiple semi-persistent CSI-IM resource sets by using the MAC CE information in the PDSCH. The first control unit 111 may be configured to activate/deactivate one of multiple semi-persistent CSI report configurations in PUCCH by using the MAC CE information in the PDSCH. The first control unit 111 may be configured to activate/deactivate one of multiple semi-persistent SRS resource sets by using the MAC CE information in the PDSCH. The first control unit 111 may be configured to activate/deactivate one of multiple semi-persistent ZP CSI-RS resource sets by using the MAC CE information in the PDSCH.

Correspondingly, the first control unit 311 of the electronic device 300 on the user equipment side may be configured to perform control to receive information on activation/deactivation of the semi-persistent resource from the base station through beam-based NTN communication. The determination unit 313 is configured to determine a temporal position at which the UE applies activation/deactivation information of the semi-persistent resource. The second control unit 315 is configured to perform control to apply the activation/deactivation information of the semi-persistent resource at the determined temporal position.

For example, referring to FIG. 3, the first control unit 311 performs control to receive information for activation/deactivation of the semi-persistent CSI-RS resource set carried by the MAC CE of the PDSCH from the base station. The determination unit 313 is configured to determine a semi-persistent CSI-RS resource set ID to be activated/deactivated and a temporal position of activation/deactivation of the semi-persistent CSI-RS resource set based on the information. The second control unit 315 is configured to perform control to apply activation/deactivation of the CSI-RS resource set indicated by the semi-persistent CSI-RS resource set ID upon arrival of the temporal position determined by the determination unit 313.

For example, referring to FIG. 3, the first control unit 311 performs control to receive information for activation/deactivation of the semi-persistent CSI-IM resource set carried by the MAC CE of the PDSCH from the base station. The determination unit 313 is configured to determine a semi-persistent CSI-IM resource set ID to be activated/deactivated and a temporal position of activation/deactivation of the semi-persistent CSI-IM resource set based on the information. The second control unit 315 is configured to perform control to apply activation/deactivation of the CSI-IM resource set indicated by the semi-persistent CSI-IM resource set ID upon arrival of the temporal position determined by the determination unit 313.

For example, referring to FIG. 3, the first control unit 311 performs control to receive information for activation/deactivation of the semi-persistent CSI report configuration in PUCCH carried by the MAC CE of the PDSCH from the base station. The determination unit 313 is configured to determine the semi-persistent CSI report configuration in PUCCH to be activated/deactivated and a temporal position of activation/deactivation of the semi-persistent CSI report configuration in PUCCH based on the information. The second control unit 315 is configured to perform control to apply activation/deactivation of the corresponding CSI report configuration in PUCCH upon arrival of the temporal position determined by the determination unit 313.

For example, referring to FIG. 3, the first control unit 311 performs control to receive information for activation/deactivation of the semi-persistent SRS resource set carried by the MAC CE of the PDSCH from the base station. The determination unit 313 is configured to determine a semi-persistent SRS resource set ID to be activated/deactivated and a temporal position of activation/deactivation of the semi-persistent SRS resource set based on the information. The second control unit 315 is configured to perform control to apply activation/deactivation of the SRS resource set indicated by the semi-persistent SRS resource set ID upon arrival of the temporal position determined by the determination unit 313.

For example, referring to FIG. 3, the first control unit 311 performs control to receive information for activation/deactivation of the semi-persistent ZP CSI-RS resource set carried by the MAC CE of the PDSCH from the base station. The determination unit 313 is configured to determine a semi-persistent ZP CSI-RS resource set ID to be activated/deactivated and a temporal position of activation/deactivation of the semi-persistent ZP CSI-RS resource set based on the information. The second control unit 315 is configured to perform control to apply activation/deactivation of the ZP CSI-RS resource set indicated by the semi-persistent ZP CSI-RS resource set ID upon arrival of the temporal position determined by the determination unit 313.

The information received from the base station by the first control unit 311 performing control may include information of a semi-persistent resource to be activated/deactivated, and may further include information used by the determination unit 313 for determining the temporal position. For example, the information for determining the temporal position that is received from the base station may include information of an absolute temporal position at which the activation/deactivation information of the semi-persistent resource is to be applied.

The semi-persistent resources include, but are not limited to, the semi-persistent zero power channel state information reference signal (semi-persistent ZP-CSI-RS), the semi-persistent non-zero power channel state information reference signal (semi-persistent CSI-RS), the semi-persistent channel state information interference measurement (semi-persistent CSI-IM), the semi-persistent channel state information reporting (semi-persistent CSI reporting), and the semi-persistent sounding reference signal (semi-persistent SRS) as described above.

This solution is applicable to the case that there is no HARQ mechanism or HARQ-ACK feedback mechanism in the NTN system.

Figure 11:
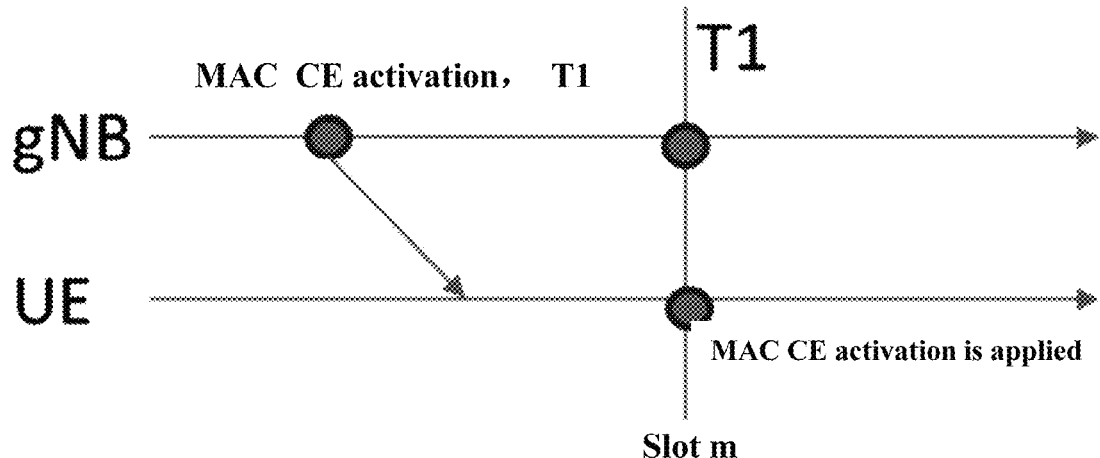

As an example, similar to the example shown in FIG. 7, FIG. 11 shows a diagram of an example of a timing configuration on the base station side and the user equipment side for activation/deactivation of the semi-persistent resource. For example, the base station includes the absolute temporal value, such as T1, for the UE to apply activation/deactivation of the semi-persistent resource into the MAC CE, where the absolute temporal value is used by the determination unit 313 on the UE side to determine the temporal position at which activation/deactivation of the semi-persistent resource is to be applied. Specifically, the UE applies the activation/deactivation information of the semi-persistent resource at the time instant T1 according to the information of the semi-persistent resource to be activated/deactivated and T1 that are received. As mentioned above, the absolute temporal value may be expressed in various time forms. In a case that the absolute temporal value T1 is expressed by a slot number, the UE applies the activation/deactivation information of the semi-persistent resource in a slot m, for example.

Figure 12:
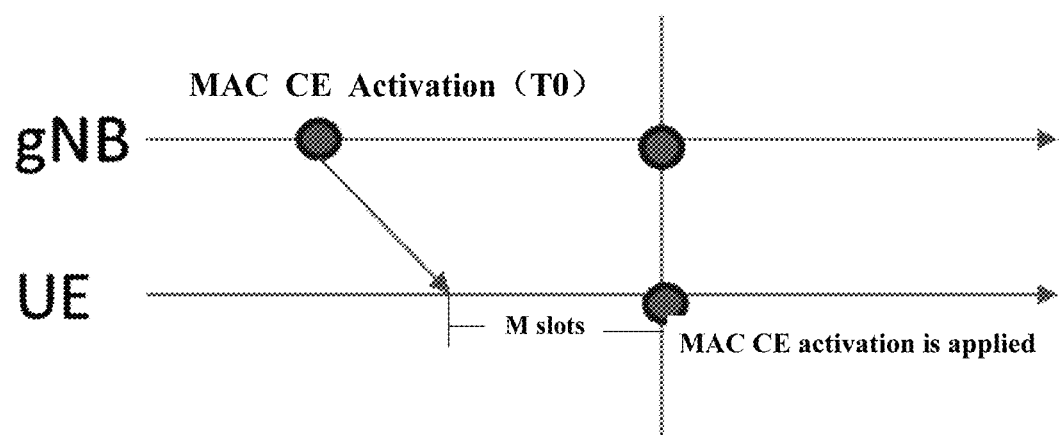

As another example, similar to the example shown in FIG. 8, FIG. 12 shows a diagram of another example of a timing configuration on the base station side and the user equipment side for activation/deactivation of the semi-persistent resource. In this example, the base station includes the absolute temporal value T0 for sending the activation/deactivation information of the semi-persistent resource into the MAC CE. The time T0 may be implicit, and may be, for example, represented by a slot number of a PDSCH carrying the MAC CE. The UE applies the activation/deactivation information of the semi-persistent resource after the elapse of a predetermined duration, such as Xms or x slots, since receipt of the MAC CE. The predetermined duration may be a predetermined value, such as 16 slots, 10 milliseconds, and the like, that is commonly known by both the base station and the UE. The predetermined value may alternatively be calculated based on a certain algorithm, such as calculated based on the distance between the satellite and the user. In addition, the value of Xms or x slots is not limited to a predefined value, but may alternatively be configured explicitly such as one of the following: directly indicated in DCI, an RRC or an MAC CE; indicated through a combination of multiple signaling; indicated by accumulating an existing reference value such as a common TA with an indication value in the DCI, the RRC or the MAC CE.

As shown in the example of FIG. 12, the UE receives the MAC CE indicating the activation/deactivation of the semi-persistent resource in a slot n, and applies the activation/deactivation information of the semi-persistent resource after the elapse of the predetermined duration of slot m. Therefore, the UE applies the activation/deactivation information of the semi-persistent resource in a slot n+m.

Therefore, exemplarily, the information received from the base station may include the information of the semi-persistent resource to be activated/deactivated and the predetermined duration, and the determination unit 313 may determine a temporal position after the elapse of the predetermined duration since receipt of the information as the temporal position at which the activation/deactivation information of the semi-persistent resource is to be applied.

As another example, similar to the example shown in FIG. 9, the information sent by the first control unit 111 on the base station side to the UE may include activation/deactivation information of a semi-persistent resource and a second duration, for the UE to apply the activation/deactivation information of the semi-persistent resource at a second temporal position after the elapse of the second duration since receipt of the information. For example, the base station sends the PDSCH containing information of an activated semi-persistent resource at a time instant T1, the user receives the PDSCH containing the information of the activated semi-persistent resource at T2, and the user applies the activation information of the semi-persistent resource at a time instant T2+X. In a case that the time instant is represented by a slot number, the above timing may be described as: the base station sends the PDSCH containing the information of the activated semi-persistent resource in a slot n, the user receives the PDSCH containing the information of the activated semi-persistent resource in a slot n, and the user applies the activation information of the semi-persistent resource at a slot n+m. It should be understood that the second duration here is equivalent to the predetermined duration in the example of FIG. 12, and relevant description is also applicable, which will not be repeated here.

According to the above examples, even in a case that there is no HARQ for the PDSCH containing semi-persistent resource activation/deactivation, the base station and the UE can correctly apply the timing of activation/deactivation of the semi-persistent resource, thereby ensuring the timing consistency of applying semi-persistent resource activation/deactivation by the base station and the UE.

In another aspect, the solution is also applicable to the case that there is the HARQ-ACK feedback mechanism in the NTN system.

Figure 13:
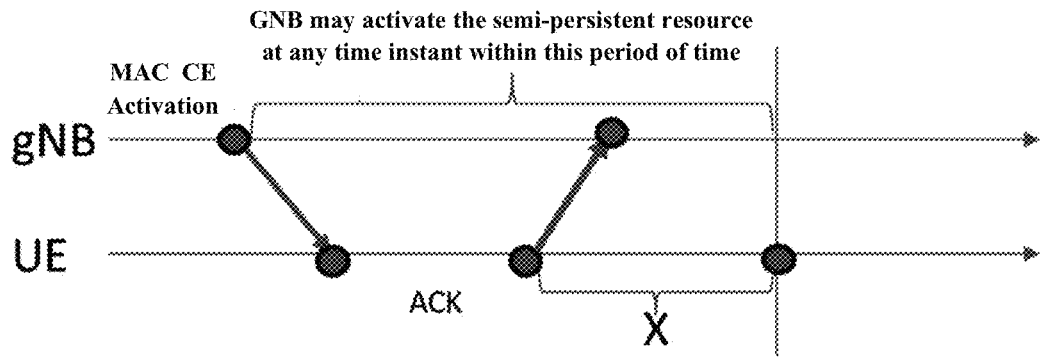

FIG. 13 shows an example of semi-persistent resource activation in the case that there is the HARQ-ACK feedback mechanism. For example, the base station sends a PDSCH which carries an MAC CE for semi-persistent resource activation. Next, the UE receives and demodulates the PDSCH. If the PDSCH is successfully demodulated, the UE feeds back an ACK to the base station, and if the PDSCH is not successfully demodulated, the UE feeds back an NACK to the base station. The UE may apply activation/deactivation information of the semi-persistent resource after the elapse of a predetermined duration, such as Xms or x slots, since the slot in which the UE sends the HARQ-ACK information for the PDSCH. The predetermined duration may be a predetermined value that is commonly known by both the base station and the UE. The predetermined duration may alternatively be calculated based on a certain algorithm, such as calculated based on the distance between the satellite and the user. In addition, the value of Xms or x slots is not limited to a predefined value, but may alternatively be configured explicitly such as one of the following: directly indicated in DCI, an RRC or an MAC CE; indicated through a combination of multiple signaling; indicated by accumulating an existing reference value such as a common TA with an indication value in the DCI, the RRC or the MAC CE.

Exemplarily, the first control unit 311 may further be configured to perform control to send a feedback for the information to the base station, and the determination unit 313 may determine the temporal position at which the activation/deactivation information of the semi-persistent resource is to be applied based on time when the feedback is sent and the predetermined duration. The feedback by the UE may include the HARQ-ACK for the PDSCH.

The first control unit 311 may be configured to use a separate HARQ process for the PDSCH carrying the beam handover information, or set an HARQ process used for the PDSCH carrying the beam handover information to be in an active state. Correspondingly, the base station configures a separate HARQ process for the PDSCH containing the semi-persistent resource activation/deactivation information, and does not perform joint reporting with other PDSCHs. Alternatively, the base station always configures an activated HARQ for the PDSCH containing the activation/deactivation information of the semi-persistent resource.

The above embodiments for semi-persistent resource configuration are briefly summarized as follows.

In the case that there is no HARQ process for the PDSCH carrying activation/deactivation information of a semi-persistent resource: the base station may send the activation/deactivation information of the semi-persistent resource and the absolute temporal information to instruct the UE when to apply the activation/deactivation information of the semi-persistent resource; or the base station may send the activation/deactivation information of the semi-persistent resource, and agree that the UE applies the activation/deactivation information of the semi-persistent resource after the elapse of a predetermined duration such as Xms or x slots since receipt of the activation/deactivation information of the semi-persistent resource.

In the case that there is the HARQ process for the PDSCH carrying activation/deactivation information of a semi-persistent resource: the timing of semi-persistent resource activation/deactivation may be designed based on the HARQ-ACK, that is, it is agreed that the UE applies the activation/deactivation information of the semi-persistent resource after the elapse of a predetermined duration such as Xms or x slots since the sending of the HARQ-ACK for the PDSCH containing the activation/deactivation information of the semi-persistent resource by the UE; in addition, a separate specific HARQ process may be used for the PDSCH carrying the activation/deactivation information of the semi-persistent resource, or the HARQ process for the PDSCH carrying the activation/deactivation information of the semi-persistent resource may always be in an enabled or active state.

As described above, the embodiments of the present disclosure are widely applicable to occasions where the HARQ feedback mechanism is not applicable and/or communication configuration operations performed based on the HARQ feedback mechanism is not applicable due to time delay, and are not limited to the specific examples above. For example, the first control unit 311 is configured to perform control to receive information on the communication configuration operation from the base station through beam-based non-terrestrial network communication; the determination unit 313 is configured to determine a temporal position for the communication configuration operation of the user equipment; and the second control unit 315 is configured to perform control to perform the communication configuration operation of the user equipment at the determined temporal position. Correspondingly, the specific operations may be adaptively modified depending on the communication configuration operation to be performed.

Figure 4:
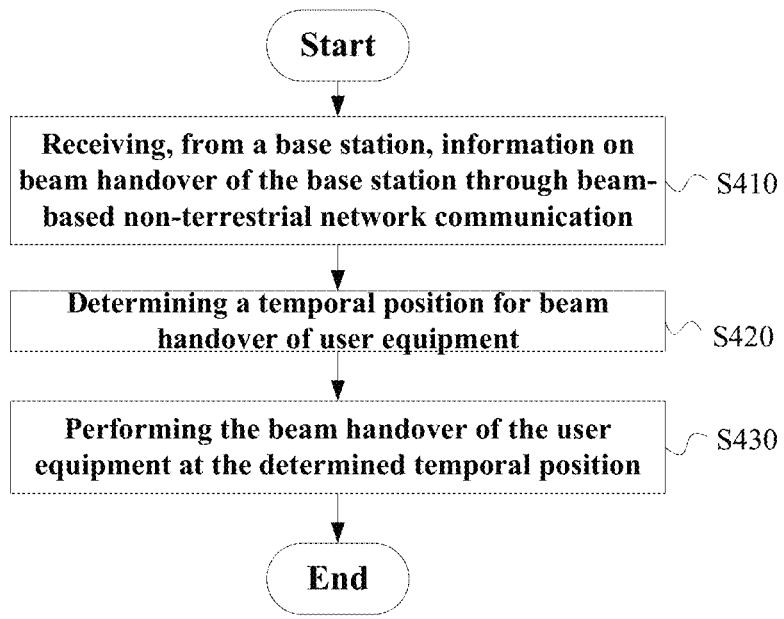
FIG. 4 is a flowchart showing a process example of a wireless communication method according to another embodiment of the present disclosure.
Figure 5:
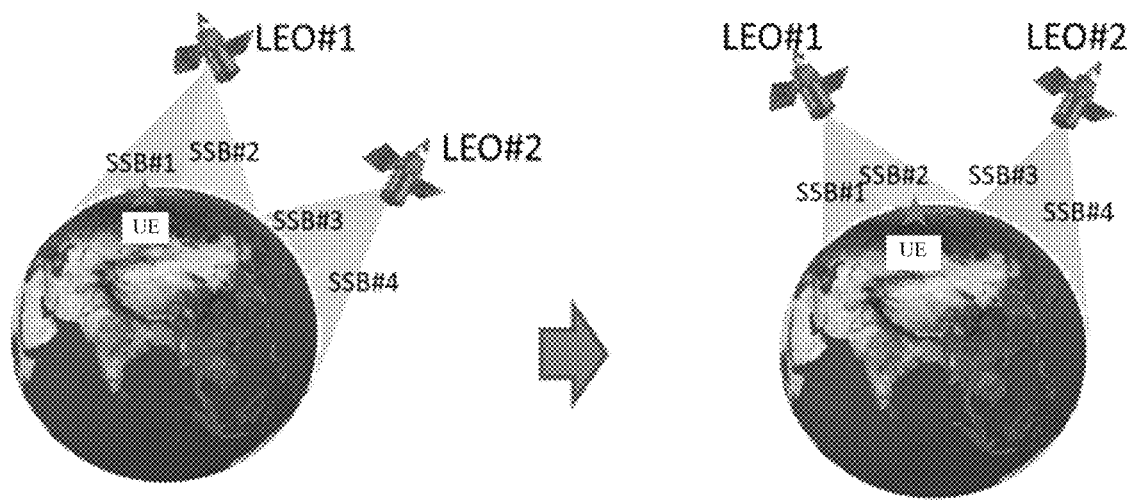
FIGS. 5 and 6 are schematic diagrams showing exemplary situations of beam handover caused by movement of a satellite.
Figure 6:

FIG. 4 shows a process example of a wireless communication method on the UE side. The method includes a step S410 of receiving, from a base station, information on beam handover of the base station through beam-based NTN communication; a step S420 of determining a temporal position for beam handover of UE; and s step S430 of performing the beam handover of the UE at the determined temporal position.

A computer readable medium is further provided according to an embodiment of the present disclosure. The computer readable medium includes executable instructions that, when executed by an information processing apparatus, cause the information processing apparatus to execute the methods according to the above embodiments.

For example, steps of the above methods and modules and/or units of the above devices may be implemented as software, firmware, hardware, or a combination thereof. In a case that steps of the above methods and modules and/or units of the above devices are implemented by software or firmware, a computer (for example, a general-purpose computer 1400 shown in FIG. 14) having a dedicated hardware structure may be installed with a program constituting software for implementing the above methods from a storage medium or a network. When being installed with various programs, the computer is capable of performing various functions.

Figure 14:
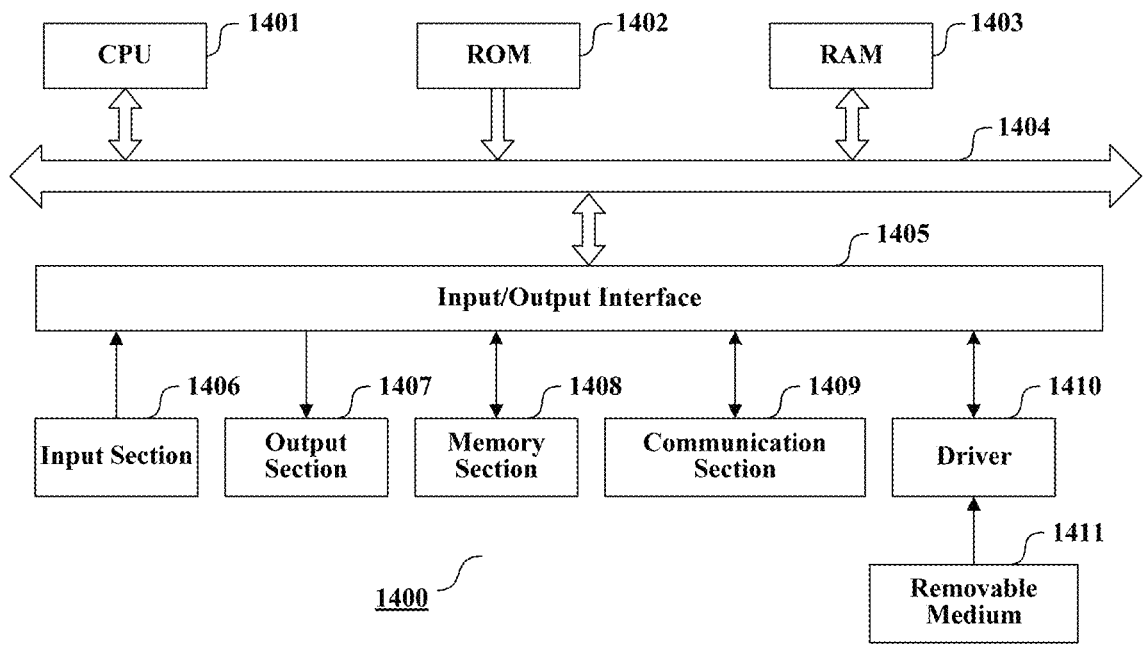
FIG. 14 is a block diagram showing an exemplary structure of a computer for implementing the methods and apparatuses according to the present disclosure.

In FIG. 14, an arithmetic processing unit (that is, a CPU) 1401 performs various processing in accordance with a program stored in a read only memory (ROM) 1402 or a program loaded from a memory section 1408 to a random access memory (RAM) 1403. The data required for the various processing performed by the CPU 1401 may be stored in the RAM 1403 as needed. The CPU 1401, the ROM 1402 and the RAM 1403 are linked to each other via a bus 1404. An input/output interface 1405 is also linked to the bus 1404.

The following components are linked to the input/output interface 1405: an input section 1406 (including a keyboard, a mouse or the like), an output section 1407 (including a display such as a cathode ray tube (CRT), a liquid crystal display (LCD), a loudspeaker or the like), a memory section 1408 (including a hard disk or the like), and a communication section 1409 (including a network interface card such as a LAN card, a modem or the like). The communication section 1409 performs communication processing via a network such as the Internet. A driver 1410 may also be linked to the input/output interface 1405 as needed. A removable medium 1411 such as a magnetic disk, an optical disk, a magneto-optical disk, a semiconductor memory may be installed on the driver 1410 as needed, so that a computer program read from the removable medium 1411 is installed into the memory section 1408 as needed.

In a case that the above series of processing are implemented by software, a program constituting the software is installed from a network such as the Internet, or a storage medium such as the removable medium 1411.

Those skilled in the art should understand that the storage medium is not limited to the removable medium 1411 shown in FIG. 14 that stores a program and is distributed separately from the apparatus so as to provide the program to the user. The removable medium 1411, for example, may include: a magnetic disk (including a floppy disk (registered trademark)); an optical disk (including a compact disk read only memory (CD-ROM) and a digital versatile disc (DVD)); a magneto-optical disk (including a minidisc (MD) (registered trademark)); and a semiconductor memory. Alternatively, the storage medium may be the ROM 1402, a hard disk included in the memory section 1408 or the like. The storage medium has a program stored therein and is distributed to the user together with an apparatus in which the storage medium is included.

A program product storing machine-readable instruction codes is further provided according to an embodiment of the present disclosure. The instruction codes, when being read and executed by a machine, may perform the methods according to the above embodiments of the present disclosure.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

The following electronic apparatus is involved in the embodiments of the present disclosure. In a case that the electronic apparatus is used for base station side, the electronic apparatus may be implemented as any type of gNB or evolved node B (eNB), such as a macro eNB and a small eNB. The small eNB may be an eNB of a cell having a smaller coverage than a macro cell, such as a pico-cell eNB, a micro eNB and a home (femto) eNB. Alternatively, the electronic apparatus may be implemented as any other types of base stations, such as a NodeB and a base transceiver station (BTS). The electronic apparatus may include: a main body (also referred to as a base station apparatus) configured to control the wireless communication; and one or more remote radio heads (RRH) provided at a different position from the main body. In addition, various types of terminals, which are described below, may each serve as a base station by performing functions of the base station temporarily or semi-persistently.

In a case that the electronic apparatus is used for user equipment side, the electronic apparatus may be implemented as a mobile terminal (such as a smartphone, a tablet personal computer (PC), a notebook PC, a portable game terminal, a portable/dongle mobile router and a digital camera) or a vehicle terminal (such as an automobile navigation apparatus). Furthermore, the electronic apparatus may be a wireless communication module (such as an integrated circuitry module including a single die or multiple dies) mounted on each of the terminals described above.

[Application Example Regarding a Terminal Apparatus]

Figure 15:
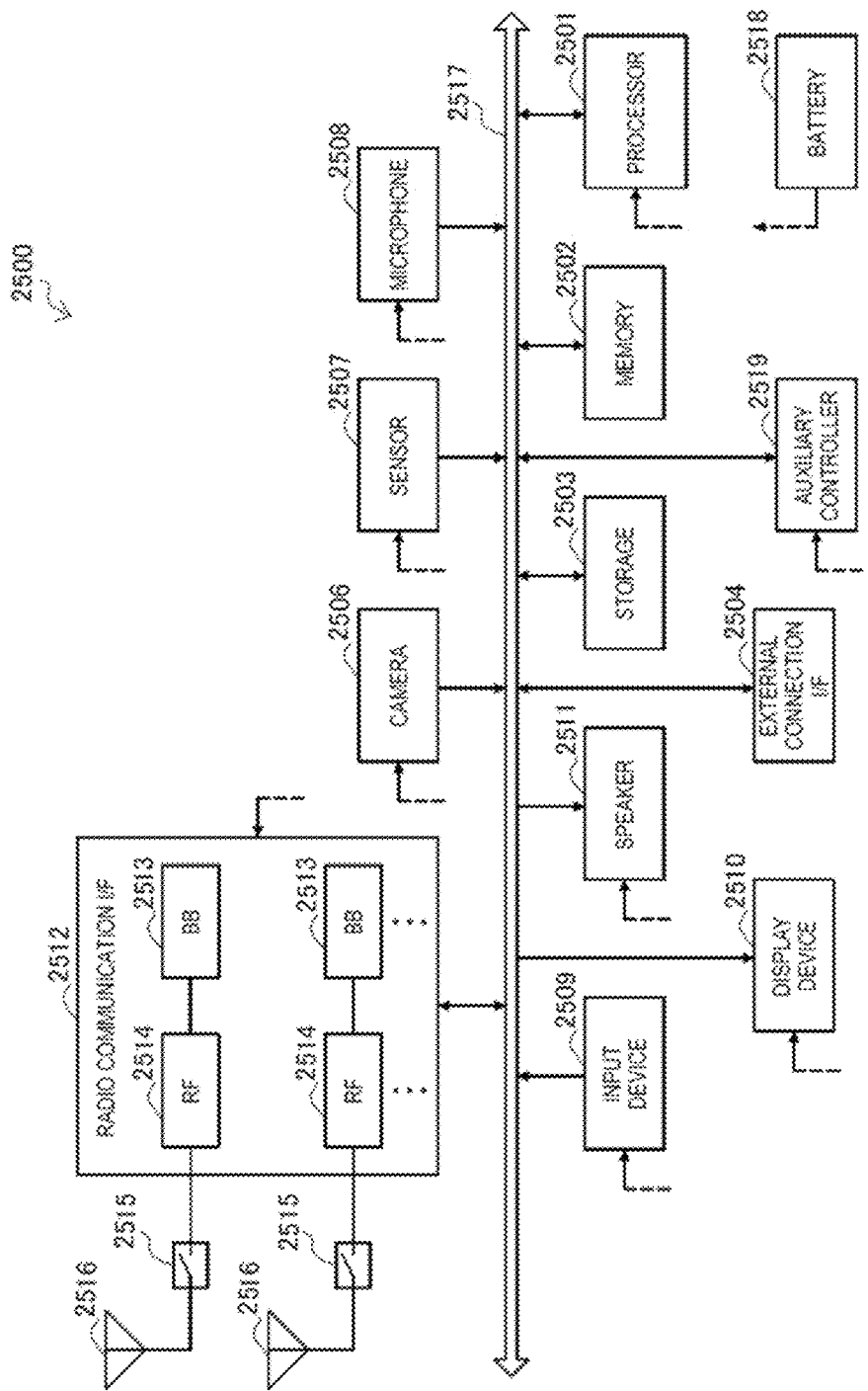
FIG. 15 is a block diagram showing an example of an exemplary configuration of a smartphone to which the technology according to the present disclosure may be applied.

FIG. 15 is a block diagram showing an exemplary configuration of a smartphone 2500 to which technology according to the present disclosure may be applied. The smartphone 2500 includes a processor 2501, a memory 2502, a storage 2503, an external connection interface 2504, a camera 2506, a sensor 2507, a microphone 2508, an input device 2509, a display device 2510, a speaker 2511, a radio communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes an RAM and an ROM, and stores data and a program executed by the processor 2501. The storage 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smartphone 2500 into an audio signal. The input device 2509 includes, for example, a touch sensor configured to detect touch on a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The speaker 2511 is configured to convert an audio signal outputted from the smartphone 2500 into sound.

The radio communication interface 2512 supports any cellular communication scheme (such as LTE and LTE-Advanced), and performs wireless communication. The radio communication interface 2512 may include, for example, a baseband (BB) processor 2513 and radio frequency (RF) circuitry 2514. The BB processor 2513 may perform, for example, coding/decoding, modulating/demodulating and multiplexing/de-multiplexing, and perform various types of signal processing for wireless communications. The RF circuitry 2514 may include, for example, a mixer, a filter and an amplifier, and transmits and receives a wireless signal via an antenna 2516. The radio communication interface 2512 may be a chip module having the BB processor 2513 and the RF circuitry 2514 integrated thereon. As shown in FIG. 15, the radio communication interface 2512 may include multiple BB processors 2513 and multiple RF circuitries 2514. Although FIG. 15 shows an example in which the radio communication interface 2512 includes the multiple BB processors 2513 and the multiple RF circuitries 2514, the radio communication interface 2512 may include a single BB processor 2513 or single RF circuitry 2514.

Besides the cellular communication scheme, the radio communication interface 2512 may support an additional type of wireless communication scheme, such as a short-distance wireless communication scheme, a near field communication scheme and a wireless local area network (LAN) scheme. In this case, the radio communication interface 2512 may include the BB processor 2513 and the RF circuitry 2514 for each wireless communication scheme.

Each of the antenna switches 2515 switches connection destinations of the antennas 2516 among multiple circuitry (such as circuitry for different wireless communication schemes) included in the radio communication interface 2512.

Each of the antennas 2516 includes a single or multiple antenna elements (such as multiple antenna elements included in an MIMO antenna), and is used for the radio communication interface 2512 to transmit and receive a wireless signal. The smartphone 2500 may include multiple antennas 2516, as shown in FIG. 15. Although FIG. 15 shows an example in which the smartphone 2500 includes the multiple antennas 2516, the smartphone 2500 may also include a single antenna 2516.

In addition, the smartphone 2500 may include an antenna 2516 for each type of wireless communication scheme. In this case, the antenna switches 2515 may be omitted from the configuration of the smartphone 2500.

The processor 2501, the memory 2502, the storage 2503, the external connection interface 2504, the camera 2506, the sensor 2507, the microphone 2508, the input device 2509, the display device 2510, the speaker 2511, the radio communication interface 2512, and the auxiliary controller 2519 are connected to each other via the bus 2517. The battery 2518 supplies power to blocks of the smartphone 2500 shown in FIG. 15 via feeders which are partially shown with dashed lines in the drawings. The auxiliary controller 2519, for example, operates a minimum necessary function of the smartphone 2500 in a sleep mode.

In the smart phone 2500 shown in FIG. 15, the transceiving device of the apparatus for user equipment side according to an embodiment of the present disclosure may be implemented by the radio communication interface 2512. At least a part of functions of the processing circuitry and/or units of the electronic device or the information processing apparatus for user equipment side according to the embodiments of the present disclosure may be implemented by the processor 2501 or the auxiliary controller 2519. For example, the auxiliary controller 2519 may perform a part of functions of the processor 2501, to reduce power consumption of the battery 2518. Further, the processor 2501 or the auxiliary controller 2519 may perform at least a part of functions of the processing circuitry and/or the units of the electronic device or the information processing apparatus for user equipment side according to the embodiments of the present disclosure by executing a program stored in the memory 2502 or the storage 2503.

[Application Example Regarding a Base Station]

Figure 16:
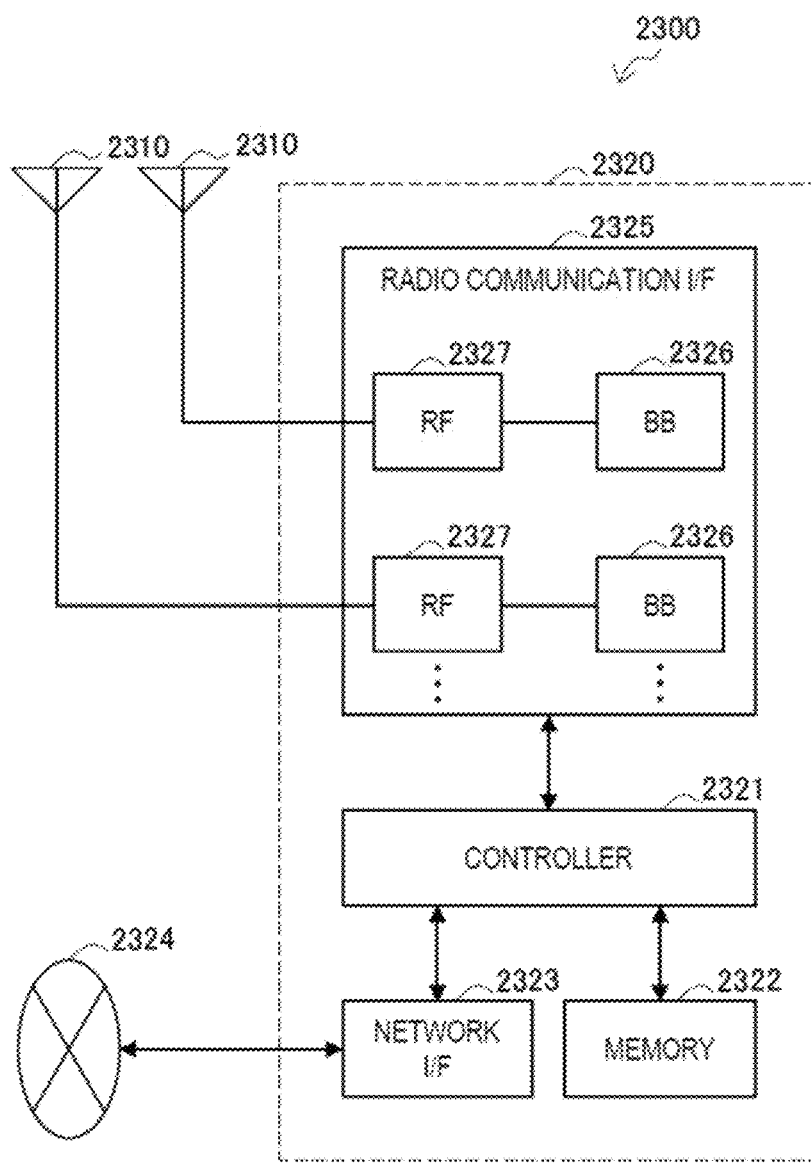
FIG. 16 is a block diagram showing an example of an exemplary configuration of a gNB (a base station) to which the technology according to the present disclosure may be applied.

FIG. 16 is a block diagram showing an exemplary configuration of a gNB to which the technology according to the present disclosure may be applied. A gNB 2300 includes multiple antennas 2310 and a base station apparatus 2320. Each of the antennas 2310 is connected to the base station apparatus 2320 via a radio frequency (RF) cable.

Each of the antennas 2310 includes a single antenna element or multiple antenna elements (such as multiple antenna elements included in a multiple-input multiple-output (MIMO) antenna), and is used for the base station apparatus 2320 to transmit and receive a wireless signal. The gNB 2300 may include multiple antennas 2310, as shown in FIG. 16. For example, the multiple antennas 2310 may be compatible with multiple frequency bands used by the gNB 2300.

The base station apparatus 2320 includes a controller 2321, a memory 2322, a network interface 2323 and a radio communication interface 2325.

The controller 2321 may be, for example, a CPU or a DSP, and operate various functions of a high layer of the base station apparatus 2320. For example, the controller 2321 generates a data packet based on data in a signal processed by the radio communication interface 2325 and transmits the generated packet via the network interface 2323. The controller 2321 may bundle data from multiple baseband processors to generate a bundled packet and transmit the generated bundled packet. The controller 2321 may have a logic function that performs control such as radio resource control, wireless bearer control, mobility management, admission control, and scheduling. The control may be performed in combination with a nearby gNB or core network node. The memory 2322 includes an RAM and an ROM, and stores a program executed by the controller 2321 and various types of control data (such as a terminal list, transmission power data and scheduling data).

The network interface 2323 is a communication interface via which the base station apparatus 2320 is connected to a core network 2324. The controller 2321 may communicate with a core network node or another gNB via the network interface 2323. In this case, the gNB 2300 may be connected to the core network node or other gNB via a logical interface (such as an S1 interface and an X2 interface). The network interface 2323 may also be a wired communication interface or a wireless communication interface for wireless backhaul line. If the network interface 2323 is the wireless communication interface, the network interface 2323 may use a frequency band for wireless communication higher than a frequency band used by the radio communication interface 2325.

The radio communication interface 2325 supports any cellular communication scheme (such as long term evolution (LTE) and LTE-Advanced), and provides wireless connection to a terminal positioned in a cell of the gNB 2300 via an antenna 2310. The radio communication interface 2325 may include, for example, a BB processor 2326 and RF circuitry 2327. The BB processor 2326 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be implemented as a memory storing a communication control program, or a module including a processor configured to execute a program and related circuitry. The function of the BB processor 2326 may be changed by updating the program. The module may be a card or blade inserted into a slot of the base station apparatus 2320. Alternatively, the module may be a chip mounted on the card or the blade. Further, the RF circuitry 2327 may include, for example, a mixer, a filter or an amplifier, and transmits and receives a wireless signal via the antenna 2310.

As shown in FIG. 16, the radio communication interface 2325 may include multiple BB processors 2326. For example, the multiple BB processors 2326 may be compatible with multiple frequency bands used by the gNB 2300. As shown in FIG. 16, the radio communication interface 2325 may include multiple RF circuitries 2327. For example, the multiple RF circuitries 2327 may be compatible with multiple antenna elements. Although FIG. 16 shows an example in which the radio communication interface 2325 includes multiple BB processors 2326 and multiple RF circuitries 2327, the radio communication interface 2325 may include a single BB processor 2326 or single RF circuitry 2327.

In the gNB 2300 shown in FIG. 16, the transceiving device of the wireless communication apparatus on base station side according to an embodiment of the present disclosure may be implemented by the radio communication interface 2325. At least a part of functions of the processing circuitry and/or units of the electronic device or the wireless communication apparatus on base station side may be implemented by the controller 2321. For example, the controller 2321 may perform at least a part of functions of the processing circuitry and/or the units of the electronic device or the wireless communication apparatus for base station side by executing the program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It should be emphasized that terms of "include/comprise" used herein indicate presence of a feature, an element, a step, or a component, but do not exclude presence or addition of one or more other features, elements, steps or components.

In the above embodiments and examples, reference numerals consist of numbers are used to represent steps and/or units. Those skilled in the art should understand that these reference numerals are only for purpose of illustration and drawing and are not indicative of the order or any other limitations thereof.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is described above through the specific embodiments of the present disclosure, it should be understood that all embodiments and examples described above are illustrative rather than restrictive. Various modifications, improvements and equivalents may be made to the present disclosure by those skilled in the art within the scope and spirit of the attached claims. These modifications, improvements or equivalents should fall within the protection scope of the present disclosure.

The invention claimed is:

1. An electronic device for wireless communications, comprising processing circuitry configured to:
   perform control to send information on beam handover of a base station to user equipment through beam-based non-terrestrial network communication;
   determine a temporal or a spatial position for the beam handover; and
   perform control to perform the beam handover upon arrival of the determined temporal or spatial position, wherein
   the processing circuitry is configured to indicate a beam to which the base station is to be switched or a beam to which the user equipment is to be switched by using indication information on a spatial colocation relationship in a physical downlink control channel (PDCCH) or a physical downlink shared channel (PDSCH).

2. The electronic device according to claim 1, wherein the information sent to the user equipment comprises the beam to which the base station is to be switched and the determined temporal or spatial position.

3. The electronic device according to claim 1, wherein the processing circuitry is configured to determine the temporal position for the beam handover, the temporal position is determined as a first temporal position after the elapse of a first duration since the sending of the information; and
   the information sent to the user equipment comprises the beam to which the base station is to be switched and a second duration, for the user equipment to perform beam handover of the user equipment at a second temporal position after the elapse of the second duration since receipt of the information.

4. The electronic device according to claim 3, wherein the processing circuitry is configured to:
   during at least a part of a period of time from the sending of the information to the beam handover of the base station, simultaneously use both a handover source beam and a handover target beam to perform communication with the user equipment,
   wherein the first duration and the second duration are set such that the second temporal position is later than the first temporal position.

5. The electronic device according to claim 1, wherein the processing circuitry is configured to determine the spatial position for the beam handover, and
   the processing circuitry is further configured to perform control to broadcast information on a satellite ephemeris map or a satellite orbit map.

6. The electronic device according to claim 1, wherein the processing circuitry is further configured to perform control to receive feedback of the user equipment for the information, and
   the processing circuitry is configured to determine the temporal position for the beam handover of the base station based on time when the feedback is sent.

7. The electronic device according to claim 6, wherein the information sent to the user equipment further comprises a distance between the base station and the user equipment.

8. The electronic device according to claim 6, wherein the feedback comprises a hybrid automatic repeat request acknowledgement for the physical downlink shared channel (PDSCH).

9. The electronic device according to claim 8, wherein the processing circuitry is configured to perform a separate hybrid automatic repeat request process for the PDSCH carrying the information; or set a hybrid automatic repeat request process used by the PDSCH carrying the information to be in an active state.

10. An electronic device for wireless communications, comprising processing circuitry configured to:
    perform control to receive, from a base station, information on beam handover of the base station through beam-based non-terrestrial network communication;
    determine a temporal position for beam handover of user equipment; and
    perform control to perform the beam handover of the user equipment at the determined temporal position,
    wherein a beam to which the base station is to be switched or a beam to which the user equipment is to be switched is indicated by using indication information on a spatial colocation relationship in a physical downlink control channel (PDCCH) or a physical downlink shared channel (PDSCH).

11. The electronic device according to claim 10, wherein
    the information received from the base station comprises the beam to which the base station is to be switched and the temporal position for the beam handover of the base station, and
    the determining comprises determining the temporal position for the beam handover of the base station as the temporal position for the beam handover of the user equipment; or
    the information received from the base station comprises the beam to which the base station is to be switched and a duration, and
    the determining comprises determining the temporal position after the elapse of the duration since receipt of the information as the temporal position for the beam handover of the user equipment; or
    the information received from the base station comprises the beam to which the base station is to be switched, a spatial position for the beam handover of the base station, and information on a satellite ephemeris map or a satellite orbit map, and
    the determining comprises determining the temporal position for the beam handover of the user equipment based on the information received from the base station.

12. The electronic device according to claim 10, wherein the processing circuitry is further configured to:
    perform control to send feedback for the information to the base station; and
    determine the temporal position for the beam handover of the user equipment based on time when the feedback is sent and a distance between the user equipment and the base station.

13. The electronic device according to claim 12, wherein the processing circuitry is further configured to:
    determine the distance between the user equipment and the base station; or
    perform control to receive information indicating the distance between the user equipment and the base station from the base station.

14. The electronic device according to claim 12, wherein the feedback comprises a hybrid automatic repeat request acknowledgement for the physical downlink shared channel (PDSCH).

15. The electronic device according to claim 14, wherein the processing circuitry is further configured to use a separate hybrid automatic repeat request process for the PDSCH carrying the information; or set a hybrid automatic repeat request process used for the PDSCH carrying the information to be in an active state.

\* \* \* \* \*